(12) United States Patent
Komatsu et al.

(10) Patent No.: US 9,799,456 B2
(45) Date of Patent: Oct. 24, 2017

(54) SOLID ELECTROLYTE CAPACITOR

(71) Applicant: RUBYCON CORPORATION, Nagano (JP)

(72) Inventors: Akihiko Komatsu, Nagano (JP); Yoshishige Sakurai, Nagano (JP); Hiroki Tsutsui, Nagano (JP); Hayato Karasawa, Nagano (JP)

(73) Assignee: RUBYCON CORPORATION, Nagano (JP)

( * ) Notice: Subject to any disclaimer, the term of this patent is extended or adjusted under 35 U.S.C. 154(b) by 117 days.

(21) Appl. No.: 14/874,359

(22) Filed: Oct. 2, 2015

(65) Prior Publication Data

US 2016/0099114 A1     Apr. 7, 2016

(30) Foreign Application Priority Data

Oct. 3, 2014   (JP) ................. 2014-205299

(51) Int. Cl.
*H01G 9/08*    (2006.01)
*H01G 9/10*    (2006.01)
*H01G 9/15*    (2006.01)
*H01G 9/012*   (2006.01)

(52) U.S. Cl.
CPC ............. *H01G 9/10* (2013.01); *H01G 9/08* (2013.01); *H01G 9/151* (2013.01); *H01G 9/012* (2013.01)

(58) Field of Classification Search
CPC ....................................... H01G 9/08
See application file for complete search history.

(56) References Cited

U.S. PATENT DOCUMENTS

2006/0279909 A1*  12/2006  Kee .............. H01G 9/0036
                                            361/528

FOREIGN PATENT DOCUMENTS

| JP | 7-226346 A    |   | 8/1995 |          |
|----|---------------|---|--------|----------|
| JP | 10-223488 A   |   | 8/1998 |          |
| JP | 2009-71324 A  |   | 4/2009 |          |
| JP | 2014022442 A  | * | 2/2014 | H01G 9/08 |

* cited by examiner

*Primary Examiner* — Eric Thomas
(74) *Attorney, Agent, or Firm* — Hauptman Ham, LLP (57) ABSTRACT

Provided is a solid electrolyte capacitor which includes: a bottomed cylindrical housing which includes a bottom surface portion and a side surface portion raised from the bottom surface portion, and has an opening portion formed on an edge portion of the side surface portion; a capacitor element which is accommodated in the inside of the housing, and is formed by winding an anode foil and a cathode foil in an overlapping state with a separator interposed therebetween and by filling a space formed between the anode foil and the cathode foil with a solid electrolyte; a sealing member which seals the opening portion of the housing in a state where the capacitor element is accommodated in the inside of the housing; and a composite sheet which is arranged between the bottom surface portion of the housing and the capacitor element, and has the structure where a resin made of a high-molecular weight compound is retained in a fiber sheet containing at least cellulose fibers.

8 Claims, 8 Drawing Sheets

| specimen | specimen 1 (present invention example) | specimen 2 (comparison example) | specimen 3 (comparison example) |
|---|---|---|---|
| presence or non-presence of fiber sheet | present | not present | not present |
| high molecular weight compound retained in fiber sheet | PEG | not present | not present |
| result of evaluation | good | bad | fair |

FIG.6A

| specimen | specimen 4 (present invention example) | specimen 5 (comparison example) | specimen 6 (comparison example) |
|---|---|---|---|
| presence or non-presence of fiber sheet | present | not present | not present |
| high molecular weight compound retained in fiber sheet | PEG | not present | not present |
| result of evaluation | good | bad | fair |

FIG.6B

| specimen | specimen 7 (present invention example) | specimen 8 (comparison example) | specimen 9 (comparison example) |
|---|---|---|---|
| main component of high molecular weight compound | polyacrylamide | polyvinyl alcohol | polypropyrene |
| result of evaluation | good | fair | bad |

SOLID ELECTROLYTE CAPACITOR

RELATED APPLICATION

The instant application claims the benefit of Japanese patent applications No. 2014-205299 filed Oct. 3, 2014, the entire disclosure of which are incorporated by reference herein.

BACKGROUND OF THE INVENTION

1. Field of the Invention

The present invention relates to a solid electrolyte capacitor.

2. Description of the Related Art

Conventionally, there has been known an electrolyte capacitor where an electrolyte solution is filled between an anode foil and a cathode foil (see JP-A-7-226346, for example).

Figure 10:
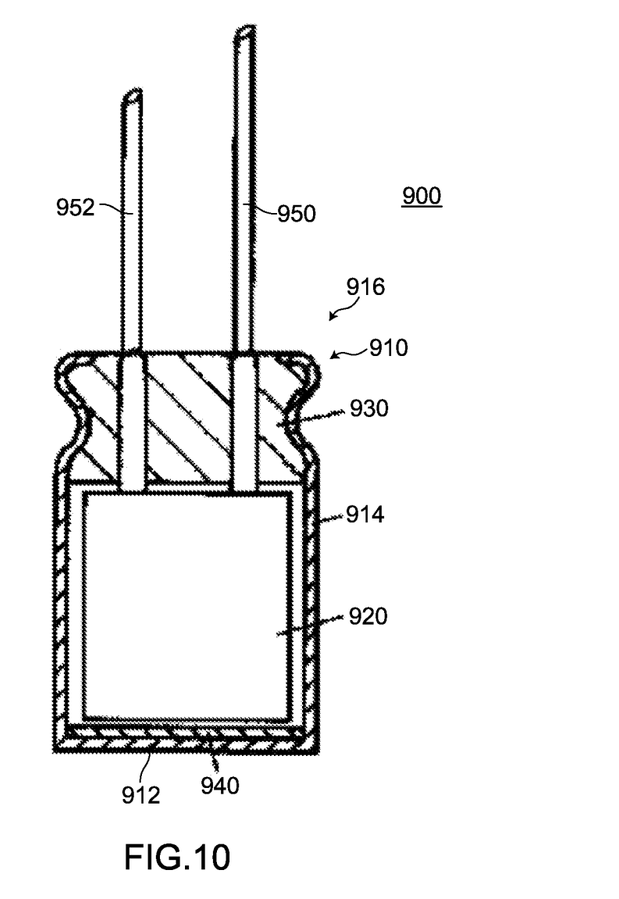
FIG. 10 is a view showing a conventional electrolyte capacitor.

FIG. 10 shows a conventional electrolyte capacitor 900. In FIG. 10, symbols 950, 952 indicate lead lines.

As shown in FIG. 10, the conventional electrolyte capacitor 900 includes: a bottomed cylindrical housing 910 which includes a bottom surface portion 912 and a side surface portion 914 raised from the bottom surface portion 912, and has an opening portion 916 formed on an edge portion of the side surface portion 914; a capacitor element 920 which is accommodated in the inside of the housing 910, and is formed by winding an anode foil and a cathode foil in an overlapping state with a separator interposed therebetween and by filling a space formed between the anode foil and the cathode foil with an electrolyte solution; and a sealing member 930 which seals the opening portion 916 of the housing 910 in a state where the capacitor element 920 is accommodated in the inside of the housing 910. A fiber sheet 940 made of cellulose paper is arranged between the bottom surface portion 912 of the housing 910 and the capacitor element 920. An oxide film is formed on a surface of the anode foil (including a surface of an edge portion).

According to the conventional electrolyte capacitor 900, the fiber sheet 940 is arranged between the bottom surface portion 912 of the housing 910 and the capacitor element 920 and hence, short-circuiting between the housing 910 and the capacitor element 920 minimally occurs. As a result, the conventional electrolyte capacitor 900 provides a capacitor having high withstand voltage.

Further, according to the conventional electrolyte capacitor 900, the fiber sheet 940 is made of cellulose paper and hence, there is no possibility that the fiber sheet 940 is dissolved into an electrolyte solution. As a result, the conventional electrolyte capacitor 900 provides a capacitor whose withstand voltage is minimally lowered even when the electrolyte capacitor 900 is used for a long period.

SUMMARY OF THE INVENTION

Recently, in a technical field of capacitors, there has been a demand for a capacitor having a longer lifetime and a lower equivalent series resistance (ESR) compared to an electrolyte capacitor. As a candidate for a capacitor which satisfies such a demand, a solid electrolyte capacitor where a solid electrolyte is filled between an anode foil and a cathode foil is named.

However, in the solid electrolyte capacitor, an electrolyte solution does not exist between an anode foil and a cathode foil and hence, there may be a case where an electric discharge is generated through a space formed between the anode foil and the cathode foil depending on a condition thus giving rise to a drawback that it is difficult for the solid electrolyte capacitor to acquire a high withstand voltage compared to an electrolyte capacitor. To overcome such a drawback, it may be possible to arrange a fiber sheet between a bottom surface portion of a housing and a capacitor element in the same manner as the above-mentioned conventional electrolyte capacitor. However, with the mere arrangement of the fiber sheet, since an electrolyte solution does not exist between the anode foil and the cathode foil, there may be a case where an electric discharge is generated through an inner space of the fiber sheet depending on a condition. Accordingly, there exists a circumstance where it is difficult for the solid electrolyte capacitor to acquire a high withstand voltage.

Further, recently, in the technical field of solid electrolyte capacitors, there also exists a circumstance which requires a solid electrolyte capacitor having excellent properties (a long lifetime property, a high withstand voltage property, an impact absorbing property or the like, for example) from various viewpoints.

The present invention has been made in view of these circumstances, and it is an object of the present invention to provide a solid electrolyte capacitor having a high withstand voltage in the same manner as conventional electrolyte capacitors and having excellent properties from various viewpoints.

Inventors of the present invention have made extensive studies to achieve the above-mentioned object and, as a result of the studies, have found that a solid electrolyte capacitor having a high withstand voltage in the same manner as conventional electrolyte capacitors and having excellent properties from various viewpoints can be realized by arranging a composite sheet having the structure where a resin made of a high-molecular weight compound is retained in a fiber sheet between a bottom surface portion of a housing and a capacitor element, and have completed the present invention based on such finding. The present invention provides a solid electrolyte capacitor described below.

[1] According to one aspect of the present invention, there is provided a solid electrolyte capacitor which includes: a bottomed cylindrical housing which includes a bottom surface portion and a side surface portion raised from the bottom surface portion, and has an opening portion formed on an edge portion of the side surface portion; a capacitor element which is accommodated in the inside of the housing, and is formed by winding an anode foil and a cathode foil in an overlapping state with a separator interposed therebetween and by filling a space formed between the anode foil and the cathode foil with a solid electrolyte; a sealing member which seals the opening portion of the housing in a state where the capacitor element is accommodated in the inside of the housing; and a composite sheet which is arranged between the bottom surface portion of the housing and the capacitor element, and has the structure where a resin made of a high-molecular weight compound is retained in a fiber sheet containing at least cellulose fibers.

According to the solid electrolyte capacitor of the present invention, between the bottom surface portion of the housing and the capacitor element, the composite sheet having the structure where a resin made of a high-molecular weight compound is retained in a fiber sheet is arranged. Accordingly, the solid electrolyte capacitor of the present invention provides a solid electrolyte capacitor having a high withstand voltage in the same manner as conventional electrolyte capacitors.

According to the solid electrolyte capacitor of the present invention, the composite sheet has the structure where a resin is retained in a fiber sheet and hence, an inner space of the fiber sheet is closed by the resin whereby no electric discharge is generated through the inner space of the fiber sheet. As a result, the solid electrolyte capacitor of the present invention provides a solid electrolyte capacitor having a high withstand voltage in the same manner as conventional electrolyte capacitors.

According to the solid electrolyte capacitor of the present invention, the composite sheet has the structure where a resin is retained in a fiber sheet and hence, with the use of a composite sheet in which a resin having various properties (for example, a hydrophilic resin, a resin having an oxide film repairing property, a resin having adhesiveness, an insulating resin, a resin having a heat insulating property or the like) is retained as a resin, the solid electrolyte capacitor of the present invention provides a solid electrolyte capacitor having excellent properties (a long lifetime property, a low ESR property, an impact absorbing property, a high withstand voltage property, a high heat insulating property or the like, for example) from various viewpoints.

As a result, the solid electrolyte capacitor of the present invention provides a solid electrolyte capacitor having a high withstand voltage in the same manner as conventional electrolyte capacitors, and having excellent properties from various viewpoints.

[2] In the solid electrolyte capacitor of the present invention, it is preferable that the resin be a hydrophilic resin.

With such a configuration, an aqueous solution is prepared by dissolving the resin into water and hence, in a step of manufacturing a solid electrolyte capacitor, the resin can easily enter an inner space of the fiber sheet. As a result, the solid electrolyte capacitor of the present invention provides a solid electrolyte capacitor which can be manufactured easily.

In this specification, "hydrophilic resin" means a resin containing a hydrophilic functional group in a side chain thereof or a resin containing bonding which exhibits hydrogen bonding in a main chain thereof. Also, in this specification, "having an oxide film repairing property" means a property capable of retaining an amount of moisture to the defect with which a defect in an oxide film can be repaired by supplying moisture to the defect when the defect is generated in the oxide film. It is preferable that the content of moisture capable of repairing the defective portion fall within a range of 2 wt % to 40 wt %.

[3] In the solid electrolyte capacitor of the present invention, it is preferable that the resin have an oxide film repairing property capable of repairing a defect by supplying moisture to the defect when the defect is generated in an oxide film.

With such a configuration, even when a defect is generated in an oxide film on an end surface (an end surface on a bottom surface portion side) of the anode foil or the cathode foil where a defect is liable to be generated in the oxide film, the defect can be repaired by supplying moisture to the defect. As a result, it is possible to provide a solid electrolyte capacitor having a higher withstand voltage and a longer lifetime.

[4] In the solid electrolyte capacitor of the present invention, it is preferable that the high-molecular weight compound contain a hydrophilic functional group in a side chain thereof.

With such a configuration, it is possible to provide a composite sheet having a high moisture retaining ability and an excellent oxide film repairing function.

When the hydrophilic functional group is any one of a phenolic group, a hidroxyphenyl carboxylic acid group, a hydroxyalkyl group, an amino group, a carbonyl group, a carboxyl group, a sulfonic acid group, an amide group, and a phosphate ester group, polarity of the high-molecular weight compound becomes large and hence, the high-molecular weight compound and water are liable to generate hydrogen bonding. As a result, it is possible to provide a composite sheet having higher moisture retaining ability.

When the hydrophilic functional group is a phenolic group, a hidroxyphenyl carboxylic acid group, a hydroxyalkyl group, a carboxyl group, a sulfonic acid group, or a phosphate ester group, the above-mentioned functional group easily generates "—O$^-$" ion by dissociating H$^+$ so that a resin made of a high-molecular weight compound containing the above-mentioned functional group becomes "ionic substance" and "substance capable of supplying oxygen". Accordingly, with such a configuration, not only a defect of an oxide film can be repaired with moisture which the resin retains but also the resin per se can also repair the defect of the oxide film since the above-mentioned "—O$^-$" ion contributes to a reaction with aluminum. As a result, it is possible to provide a composite sheet having a higher oxide film repairing function.

When a hydrophilic functional group is an amino group, the amino group is ionized so that dedoping of a conductive high-molecular weight compound is induced. Accordingly, conductivity of the conductive high-molecular weight compound existing on the periphery of the composite sheet is remarkably lowered and hence, short-circuiting between the capacitor element and the housing more minimally occurs.

Further, when a hydrophilic functional group is a phenolic group, a hidroxyphenyl carboxylic acid group, a hydroxyalkyl group, an amino group, a carbonyl group, a carboxyl group, an amide group, or a phosphate ester group, a high-molecular weight compound having the above-mentioned functional group includes a substance which easily generates an electrophilic addition reaction with a conductive high-molecular weight compound or a substance which easily generates a hydration reaction and hence, a π bonding of a conductive high-molecular weight compound is cut off by the substance. Accordingly, conductivity of the conductive high-molecular weight compound existing on the periphery of the composite sheet is lowered and hence, short-circuiting between the capacitor element and the housing more minimally occurs.

Among the above-mentioned functional groups, a phenolic group is also referred to as a hydroxyphenyl group. A hidroxyphenyl carboxylic acid group is a functional group where one hydrogen in an aromatic ring of a hydroxyphenyl group is replaced with a carboxyl group, and has the structure corresponding to a hydroxybenzonic acid. A sulfonic acid group is also referred to as a sulfo group.

[5] In the solid electrolyte capacitor of the present invention, it is preferable that the high-molecular weight compound contain bonding which exhibits hydrogen bonding in a main chain, and the resin contain 2 wt % or more of moisture.

With such a configuration, it is possible to provide a composite sheet having a high moisture retaining ability and an excellent oxide film repairing function. In this configuration, the reason "the resin contains 2 wt % or more of moisture" is set is that when the resin contains less than 2 wt % of moisture, there may be a case where a defective portion cannot be completely repaired.

When bonding which exhibits hydrogen bonding is ether bonding, carbonyl bonding, amide bonding or ester bonding, polarity of a high-molecular weight compound is increased and hence, a high-molecular weight compound and water can easily generate hydrogen bonding. As a result, it is possible to provide a composite sheet having a higher moisture retaining ability.

Further, when bonding which exhibits hydrogen bonding is carbonyl bonding, amide bonding or ester bonding, a high-molecular weight compound having the above-mentioned bonding includes a substance which easily generates an electrophilic addition reaction with a conductive high-molecular weight compound or a substance which easily generates a hydration reaction and hence, a π bonding of a conductive high-molecular weight compound is cut off by the substance. Accordingly, conductivity of the conductive high-molecular weight compound existing on the periphery of the composite sheet is lowered and hence, short-circuiting between the capacitor element and the housing more minimally occurs.

[6] In the solid electrolyte capacitor of the present invention, it is preferable that the resin have adhesiveness, and the composite sheet be adhered to the bottom surface portion of the housing by means of the resin.

With such a configuration, even when an impact is applied to the solid electrolyte capacitor from the outside, the composite sheet is minimally displaced from a predetermined position. As a result, the solid electrolyte capacitor of the present invention provides a solid electrolyte capacitor having an impact absorbing property.

[7] In the solid electrolyte capacitor of the present invention, it is preferable that the resin be an insulating resin.

With such a configuration, the solid electrolyte capacitor of the present invention provides a solid electrolyte capacitor having a high withstand voltage property.

[8] In the solid electrolyte capacitor of the present invention, it is preferable that the resin have a heat insulating property.

With such a configuration, when high temperature treatment is performed in a step of manufacturing a solid electrolyte capacitor, it is possible to prevent the transfer of heat from the outside to the capacitor element through the housing thus preventing a change in properties of the capacitor element caused by the heat.

[9] In the solid electrolyte capacitor of the present invention, it is preferable that the density of the fiber sheet fall within a range of 0.2 $g/cm^3$ to 1.4 $g/cm^3$.

With such a configuration, the solid electrolyte capacitor of the present invention provides a solid electrolyte capacitor where short-circuiting more minimally occurs between the housing and the capacitor element, and a resin easily enters an inner space of the fiber sheet in a step of manufacturing the solid electrolyte capacitor.

The reason the density of the fiber sheet is set to 0.2 $g/cm^3$ or more is that when the density of the fiber sheet is less than 0.2 $g/cm^3$, the inner space of the fiber sheet is large and hence, the composite sheet is indented thus making a distance between the capacitor element and the bottom surface portion of the housing short whereby there may be a case where short-circuiting occurs between the housing and the capacitor element depending on a condition. On the other hand, the reason the density of the fiber sheet is set to 1.4 $g/cm^3$ or less is that when the density of the fiber sheet exceeds 1.4 $g/cm^3$, the inner space of the fiber sheet is small and hence, a resin minimally enters the inner space of the fiber sheet in a step of manufacturing the solid electrolyte capacitor. From the above-mentioned viewpoints, the density of the fiber sheet is preferably set to a value which falls within a range of 0.25 $g/cm^3$ to 1.3 $g/cm^3$, and more preferably to a value which falls within a range of 0.30 $g/cm^3$ to 1.2 $g/cm^3$.

[10] In the solid electrolyte capacitor of the present invention, it is preferable that a thickness of the composite sheet be set to a value which falls within a range of 1 μm to 200 μm.

With such a configuration, the solid electrolyte capacitor of the present invention provides a solid electrolyte capacitor where short-circuiting more minimally occurs between the housing and the capacitor element, and a demand for lowering a height of the solid electrolyte capacitor can be satisfied.

The reason the thickness of the composite sheet is set to 1 μm or more is that when the thickness of the composite sheet is less than 1 μm, the capacitor element and the bottom surface portion of the housing become close to each other and hence, there may be a case where short-circuiting occurs between the housing and the capacitor element depending on a condition. On the other hand, the reason the thickness of the composite sheet is set to 200 μm or less is that when the thickness of the composite sheet exceeds 200 μm, there may be a case where a resin minimally enters the inner space of the fiber sheet in a step of manufacturing the solid electrolyte capacitor. From the above-mentioned viewpoints, the thickness of the composite sheet is preferably set to a value which falls within a range of 10 μm to 150 μm, and is more preferably set to a value which falls within a range of 20 μm to 100 μm.

DESCRIPTION OF PREFERRED EMBODIMENTS

Hereinafter, a solid electrolyte capacitor according to the present invention is explained based on embodiments shown in the drawings.

Embodiment 1

1. Configuration of Solid Electrolyte Capacitor 1 of Embodiment 1

Firstly, the configuration of a solid electrolyte capacitor 1 of an embodiment 1 is explained together with the configuration of a housing 10 which forms a part of the solid electrolyte capacitor 1 of an embodiment 1.

Figures 1A, 1B:
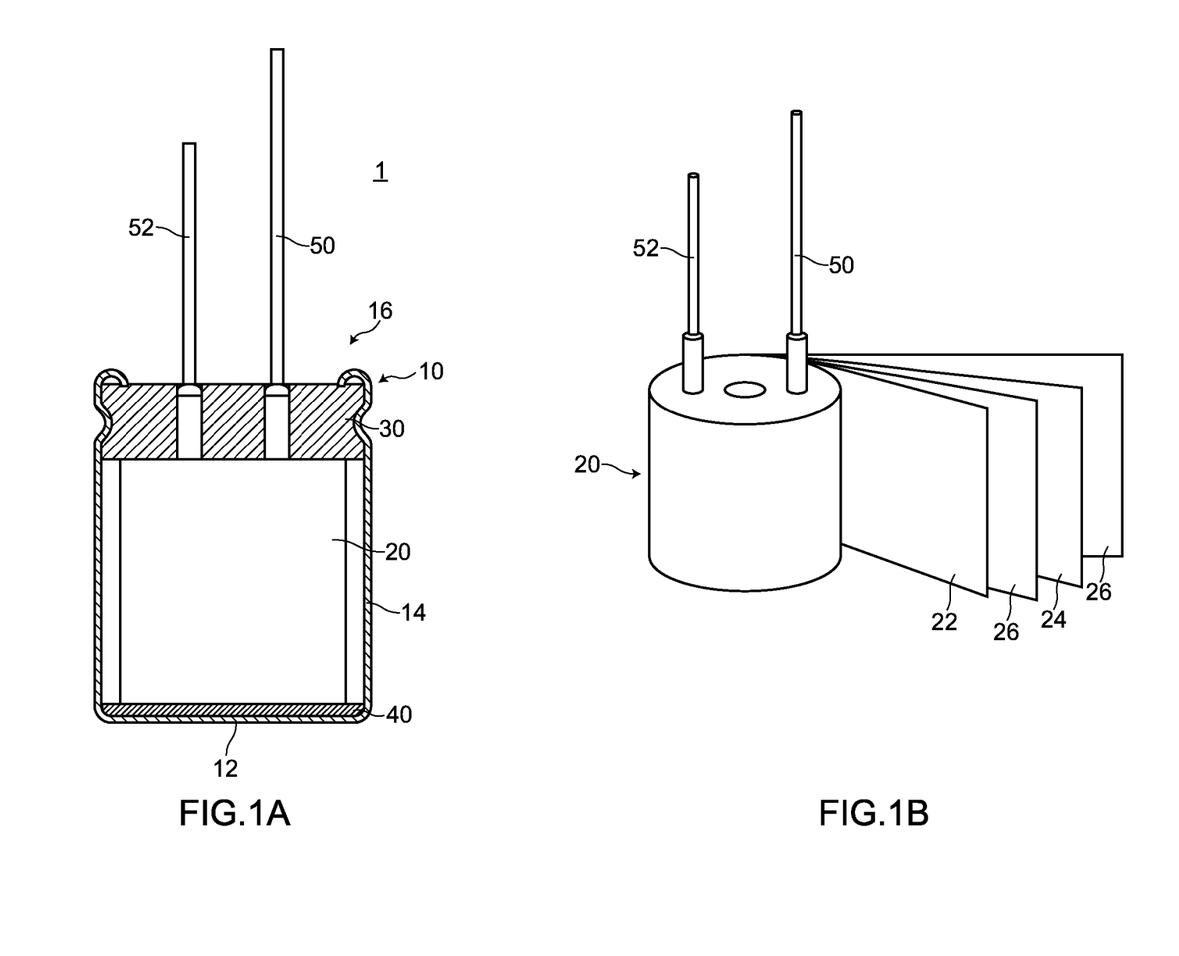
FIGS. 1A and 1B are views for explaining a solid electrolyte capacitor of an embodiment 1.

FIG. 1A and FIG. 1B are views for explaining the solid electrolyte capacitor 1 of the embodiment 1. FIG. 1A is a cross-sectional view of the solid electrolyte capacitor 1, and FIG. 1B is an exploded perspective view of a capacitor element 20.

Figure 2:
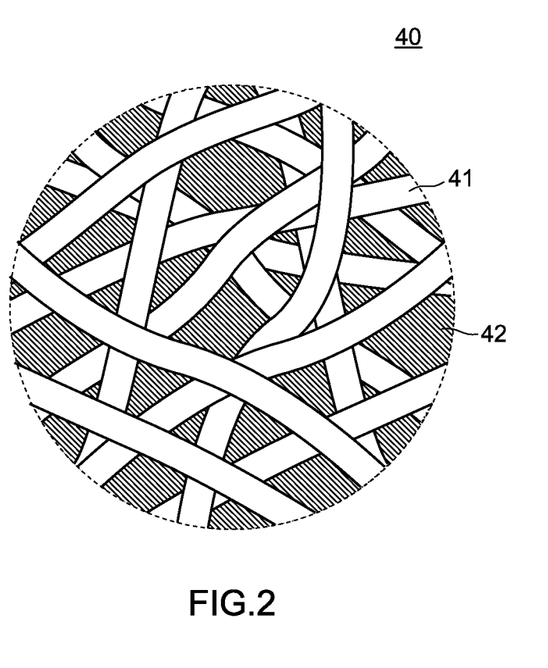
FIG. 2 is a view for explaining a composite sheet in the embodiment 1.

FIG. 2 is a view for explaining a composite sheet 40 in the embodiment 1.

The solid electrolyte capacitor 1 of the embodiment 1 is a winding-type solid electrolyte capacitor. As shown in FIG. 1A, the solid electrolyte capacitor 1 includes: the housing 10; the capacitor element 20; a sealing member 30; and the composite sheet 40.

The housing 10 is a bottomed cylindrical case which includes a bottom surface portion 12 and a side surface portion 14 raised from the bottom surface portion 12, and has an opening portion 16 formed on an edge portion of the side surface portion 14. The housing 10 is a case made of metal (made of aluminum, for example). An explosion-proof valve (not shown in the drawing) for preventing a rupture of the housing 10 at the time of the occurrence of an abnormal operation is formed in the vicinity of a center portion of the bottom surface portion 12.

The capacitor element 20 is accommodated in the inside of the housing 10. As shown in FIG. 1B, an anode foil 22 and a cathode foil 24 are wound in an overlapping state with a separator 26 interposed therebetween, and a space formed between the anode foil 22 and the cathode foil 24 is filled with a solid electrolyte.

Both the anode foil 22 and the cathode foil 24 are made of valve metal (aluminum, for example). An oxide film (not shown in the drawing) is formed on a surface of the anode foil 22 and a surface of the cathode foil 24 (both surfaces including a surface of an end portion). The anode foil 22 is electrically connected with a lead line 50 and the cathode foil 24 is electrically connected with a lead line 52 respectively. The lead line 50 connected with the anode foil 22 forms an anode terminal of the solid electrolyte capacitor 1 and the lead line 52 connected with the cathode foil 24 forms a cathode terminal of the solid electrolyte capacitor 1.

The separator 26 is a sheet having a heat resistance property and is formed such that a solid electrolyte is adhered to a surface of the separator 26. A width (width in the vertical direction in FIG. 1B) of the separator 26 is set larger than winding widths of the anode foil 22 and the cathode foil 24 so that a bottom surface portion of the capacitor element 20 is formed of the separator 26. The separator 26 may be formed using heat resistant cellulose paper or heat resistant flameproof paper, for example.

The solid electrolyte contains a conductive high-molecular weight compound and a specified stabilizing substance. In this embodiment, PEDOT (polyethylenedioxythiophene)) is used as the conductive high-molecular weight compound. However, besides PEDOT, other suitable materials such as polythiophene other than PEDOT, other conductive polymer particles or a charge-transfer complex (TCNQ complex or the like) may be used. The specified stabilizing substance functions as a dopant to be added to the conductive high-molecular weight compound. A polystyrene sulfonic acid (PSS) is used as the specified stabilizing substance. However, other substances may be used.

The capacitor element 20 can be prepared in the following manner. Firstly, the surface of the anode foil 22 and the surface of the cathode foil 24 are roughened by an etching treatment. Next, an oxide film is formed on the surface of the anode foil 22 by applying a chemical conversion treatment to the surface, and an oxide film is formed on the surface of the cathode foil 24 by natural oxidation. Next, the anode foil 22 and the cathode foil 24 are wound in an overlapping state with the separator 26 interposed therebetween and, thereafter, a chemical conversion treatment is performed by immersing a wound body formed of the anode foil 22, the cathode foil 24 and the separator 26 in a chemical conversion liquid. Next, a solid electrolyte is filled between the anode foil 22 and the cathode foil 24.

The capacitor element 20 can be prepared as described above.

The sealing member 30 seals the opening portion 16 of the housing 10 in a state where the capacitor element 20 is accommodated in the inside of the housing 10. A suitable material may be used for forming the sealing member 30. For example, the sealing member 30 is formed using rubber to which an inorganic matter or carbon is added. Through holes are formed in the sealing member 30. The lead lines 50, 52 penetrate the through holes.

As shown in FIG. 1A, FIG. 1B and FIG. 2, the composite sheet 40 is arranged between the bottom surface portion 12 of the housing 10 and the capacitor element 20, and has the structure where a resin 42 made of a high-molecular weight compound is retained in a fiber sheet 41. The composite sheet 40 is arranged such that the composite sheet 40 covers the whole bottom surface portion 12. A thickness of the composite sheet 40 is set to a value which falls within a range of 1 μm to 200 μm, and is set to 20 μm, for example. A volume resistivity of the composite sheet 40 is 1 kΩcm or more, and is set to 15 kΩcm, for example.

In the composite sheet 40, the resin 42 has adhesiveness, and the composite sheet 40 is adhered to the bottom surface portion 12 of the housing 10 by means of the resin 42.

The fiber sheet 41 contains at least cellulose fibers. Paper, woven fabric, non-woven fabric or the like may be suitably used for forming the fiber sheet 41. Cellulose paper may be used for forming the fiber sheet 41, for example. A density of the fiber sheet 41 is set to a value which falls within a range of 0.2 g/cm$^3$ to 1.4 g/cm$^3$.

The resin 42 is an insulating resin which also has a heat insulating property.

The resin 42 is a hydrophilic resin and hence, the resin 42 is also a resin having an oxide film repairing property with which a defect in an oxide film can be repaired by supplying moisture to the defect when a defect is generated in the oxide film. The high-molecular weight compound which forms the resin 42 is a high-molecular weight compound containing a hydrophilic functional group in a side chain. As such a high-molecular weight compound, polyacrylamide (PAM) containing an amide group in a side chain thereof may be named. Polyacrylamide (PAM) also has an advantage of possessing an excellent film forming property.

2. Oxide Film Repairing Function of Solid Electrolyte Capacitor 1

Next, an oxide film repairing function by the resin 42 is explained.

On an end surface of the anode foil 22 and an end surface of the cathode foil 24, there may be a case where a defect is generated in an oxide film at the time of accommodating the capacitor element 20 in the housing 10 or when an impact or heat (for example, heat at the time of mounting the capacitor element 20 on a printed circuit board using soldering) is applied to the capacitor element 20 from the outside.

In such a case, in the vicinity of an end surface of the anode foil 22, aluminum which is exposed due to a defect generated in the oxide film and moisture supplied from a resin 42 react with each other so that a defective portion of the oxide film is repaired by itself. Also in the cathode foil 24, aluminum which is exposed due to a defect generated in the oxide film and moisture supplied from the resin 42 react with each other so that a defective portion of the oxide film is repaired by itself.

As a resin having an oxide film repairing property, a resin made of a high-molecular weight compound containing an amino group other than polyacrylamide (PAM) in a side chain thereof or a resin made of a high-molecular weight compound containing other hydrophilic functional group in a side chain thereof may be used.

3. Method of Manufacturing Solid Electrolyte Capacitor of Embodiment 1

Next, a method of manufacturing the solid electrolyte capacitor 1 of the embodiment 1 (method of manufacturing the solid electrolyte capacitor of the embodiment 1) is explained.

Figure 3:
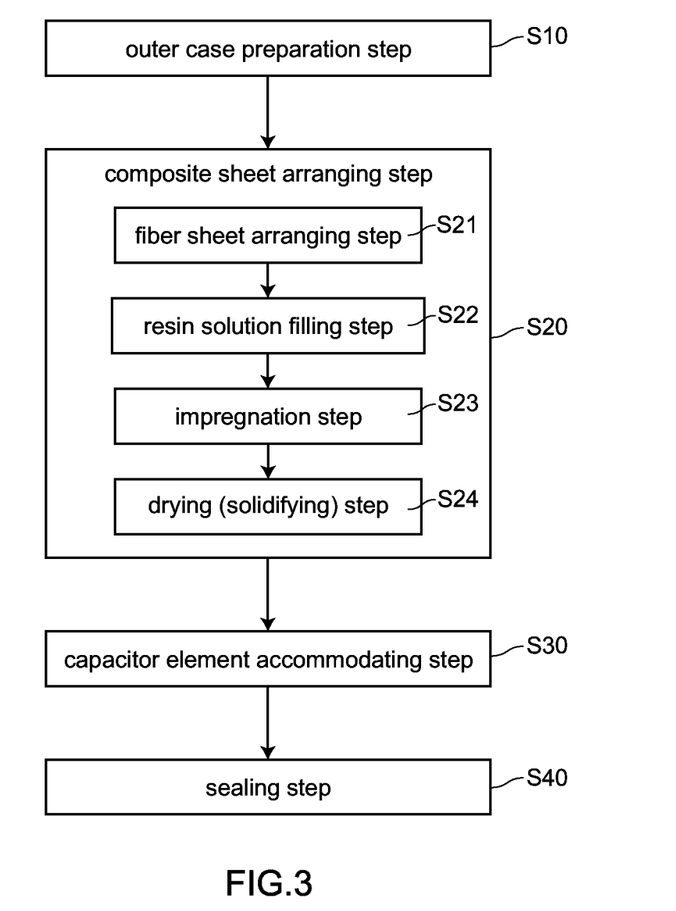
FIG. 3 is a flowchart showing a method of manufacturing a solid electrolyte capacitor of the embodiment 1.

FIG. 3 is a flowchart showing the method of manufacturing the solid electrolyte capacitor of the embodiment 1.

As shown in FIG. 3, the method of manufacturing the solid electrolyte capacitor of the embodiment 1 includes; a housing preparing step S10; a composite sheet arranging step S20; a capacitor element accommodating step S30; and a sealing step S40 in this order. Hereinafter, the method of manufacturing the solid electrolyte capacitor of the embodiment 1 is explained in accordance with the respective steps.

(1) Housing Preparing Step S10

In the housing preparing step S10, the bottomed cylindrical housing 10 is prepared. The bottomed cylindrical housing 10 includes the bottom surface portion 12 and the side surface portion 14 raised from the bottom surface portion 12, and has the opening portion 16 formed on the edge portion of the side surface portion 14.

(2) Composite Sheet Arranging Step S20

Next, the composite sheet 40 is arranged on the bottom surface portion 12 of the housing 10. The composite sheet arranging step S20 includes: a fiber sheet arranging step S21; a resin solution filling step S22; an impregnating step S23; and a drying (solidifying) step S24 in this order.

(2-1) Fiber Sheet Arranging Step S21

Firstly, the fiber sheet 41 is inserted into the inside of the housing 10 and is arranged on the bottom surface portion 12 of the housing 10. In the fiber sheet arranging step S21, the fiber sheet 41 is inserted in the housing 10 while bringing the edge portion of the fiber sheet 41 into contact with the side surface portion 14. Due to such a configuration, the fiber sheet 41 can be correctly arranged at a predetermined position of the bottom surface portion 12.

(2-2) Resin Solution Filling Step S22

Next, a resin solution containing a high-molecular weight compound is filled in the housing 10 (on the fiber sheet 41 in the housing 10). An aqueous solution prepared by dissolving polyacrylamide (PAM) and ethylene glycol for enhancing dispersibility in water is used as the resin solution. However, a liquid prepared by dissolving polyacrylamide in water may be also used as the resin solution.

(2-3) Impregnating Step S23

Next, while holding a temperature of the atmosphere at a room temperature, the resin solution filled into the fiber sheet 41 is impregnated into the fiber sheet 41. In this manner, the resin 42 made of a high-molecular weight compound is retained in the fiber sheet 41.

(2-4) Drying (Solidifying) Step S24

Next, the composite sheet 40 is formed by drying the fiber sheet 41 impregnated with the resin solution together with the housing 10 such that the content of moisture in the resin 42 becomes a desired value. In the process where the resin 42 is solidified, the composite sheet 40 is adhered to the bottom surface portion 12 of the housing 10 by means of the resin 42. A drying temperature is set to 110° C., for example, and a drying time is set to 20 minutes, for example.

(3) Capacitor Element Accommodating Step S30 and Sealing Step S40

Next, the sealing member 30 is mounted on the capacitor element 20 and, thereafter, the capacitor element 20 is inserted into the housing 10. Then, the opening portion 16 is sealed by the sealing member 30, and the housing 10 is caulked in the vicinity of an opening end of the housing 10.

Next, an aging step is performed by applying a predetermined voltage to the capacitor element 20 under a high temperature atmosphere.

The solid electrolyte capacitor 1 of the embodiment 1 can be manufactured in accordance with the above-mentioned steps.

4. Advantageous Effects of Solid Electrolyte Capacitor 1 of Embodiment 1

According to the solid electrolyte capacitor 1 of the embodiment 1, between the bottom surface portion 12 of the housing 10 and the capacitor element 20, the composite sheet 40 having the structure where the resin 42 made of a high-molecular weight compound is retained in the fiber sheet 41 is arranged. Accordingly, the solid electrolyte capacitor 1 of the embodiment 1 provides a solid electrolyte capacitor having a high withstand voltage in the same manner as a conventional electrolyte capacitor 900.

According to the solid electrolyte capacitor 1 of the embodiment 1, the composite sheet 40 has the structure where the resin 42 is retained in the fiber sheet 41 and hence, an inner space of the fiber sheet 41 is closed by the resin whereby no electric discharge is generated through the inner space of the fiber sheet 41. As a result, the solid electrolyte capacitor 1 of the embodiment 1 provides a solid electrolyte capacitor having a high withstand voltage in the same manner as the conventional electrolyte capacitor 900.

According to the solid electrolyte capacitor 1 of the embodiment 1, the composite sheet 40 has the structure where the resin 42 is retained in the fiber sheet 41 and hence, with the use of a composite sheet in which a resin having various properties (for example, a hydrophilic resin, a resin having an oxide film repairing property, a resin having adhesiveness, an insulating resin, a resin having a heat insulating property or the like) is retained as the resin 42, the solid electrolyte capacitor 1 of the embodiment 1 provides a solid electrolyte capacitor having excellent properties from various viewpoints (a long lifetime property, a low ESR property, an impact absorbing property, a high withstand voltage property, a high heat insulating property or the like, for example).

As a result, the solid electrolyte capacitor 1 of the embodiment 1 provides a solid electrolyte capacitor having a high withstand voltage in the same manner as conventional electrolyte capacitors, and having excellent properties from various viewpoints.

Further, according to the solid electrolyte capacitor 1 of the embodiment 1, the resin 42 is a hydrophilic resin and hence, an aqueous solution can be prepared by dissolving the resin 42 into water. Accordingly, in a step of manufacturing the solid electrolyte capacitor, the resin can easily enter an inner space of the fiber sheet 41.

According to the solid electrolyte capacitor 1 of the embodiment 1, the resin 42 has an oxide film repairing property capable of repairing a defect by supplying moisture to the defect when the defect is generated in an oxide film. Accordingly, even when a defect is generated in an oxide film on an end surface (an end surface on a bottom surface portion 12 side) of the anode foil 22 or the cathode foil 24 where a defect is liable to be generated in the oxide film, the defect can be repaired by supplying moisture to the defect. As a result, it is possible to provide a solid electrolyte capacitor having a higher withstand voltage and a longer lifetime.

According to the solid electrolyte capacitor 1 of the embodiment 1, the high-molecular weight compound (polyacrylamide) of the resin 42 contains a hydrophilic functional group (amide group) in a side chain thereof. Accordingly, it is possible to provide a composite sheet having a high moisture retaining ability and an excellent oxide film repairing function.

According to the solid electrolyte capacitor 1 of the embodiment 1, since the hydrophilic functional group is an amide group, polarity of the high-molecular weight compound becomes large and hence, the high-molecular weight compound and water easily generate hydrogen bonding. As a result, it is possible to provide a composite sheet having higher moisture retaining ability. Since the hydrophilic functional group is an amide group, a high-molecular weight compound includes a substance which easily generates an electrophilic addition reaction with a conductive high-molecular weight compound or a substance which easily generates a hydration reaction and hence, a π bonding of a conductive high-molecular weight compound is cut off by the substance. Accordingly, conductivity of the conductive high-molecular weight compound existing on the periphery of the composite sheet is lowered and hence, short-circuiting between the housing 10 and the capacitor element 20 more minimally occurs.

According to the solid electrolyte capacitor 1 of the embodiment 1, the resin 42 has adhesiveness, and the composite sheet 40 is adhered to the bottom surface portion 12 of the housing 10 by means of the resin 42. Accordingly, even when an impact is applied to the solid electrolyte capacitor 1 from the outside, the composite sheet 40 is minimally displaced from a predetermined position. As a result, the solid electrolyte capacitor 1 of the embodiment 1 provides a solid electrolyte capacitor having an impact absorbing property.

According to the solid electrolyte capacitor 1 of the embodiment 1, the resin is an insulating resin. Accordingly, the solid electrolyte capacitor 1 of the embodiment 1 provides a solid electrolyte capacitor having a high withstand voltage property.

According to the solid electrolyte capacitor 1 of the embodiment 1, the resin has a heat insulating property. Accordingly, the solid electrolyte capacitor 1 of the embodiment 1 provides a solid electrolyte capacitor having a high heat insulating property.

According to the solid electrolyte capacitor 1 of the embodiment 1, the density of the fiber sheet 41 falls within a range of 0.2 g/cm$^3$ to 1.4 g/cm$^3$. Accordingly, the solid electrolyte capacitor 1 of the embodiment 1 provides a solid electrolyte capacitor where short-circuiting between the housing 10 and the capacitor element 20 more minimally occurs, and the resin 42 easily enters an inner space of the fiber sheet 41 in a step of manufacturing the solid electrolyte capacitor.

According to the solid electrolyte capacitor 1 of the embodiment 1, a thickness of the composite sheet 40 is set to a value which falls within a range of 1 μm to 200 μm. Accordingly, the solid electrolyte capacitor 1 of the embodiment 1 provides a solid electrolyte capacitor where short-circuiting between the housing 10 and the capacitor element 20 more minimally occurs, and a demand for lowering a height of the solid electrolyte capacitor can be satisfied.

Embodiment 2

A solid electrolyte capacitor of an embodiment 2 (not shown in the drawing) basically has substantially the same configuration as the solid electrolyte capacitor 1 of the embodiment 1. However, the solid electrolyte capacitor of the embodiment 2 differs from the solid electrolyte capacitor 1 of the embodiment 1 in a kind of high-molecular weight compound (kind of resin). That is, in the solid electrolyte capacitor of the embodiment 2, the high-molecular weight compound contains bonding which exhibits hydrogen bonding in a main chain, and the resin 42 contains 2 wt % or more of moisture. As such a high-molecular weight compound, hydroxyethyl cellulose can be named, for example.

As described above, although the solid electrolyte capacitor of the embodiment 2 differs from the solid electrolyte capacitor 1 of the embodiment 1 in the kind of high-molecular weight compound (kind of resin), in the same manner as the solid electrolyte capacitor 1 of the embodiment 1, the solid electrolyte capacitor of the embodiment 2 also provides a solid electrolyte capacitor having a high withstand voltage in the same manner as conventional electrolyte capacitors and having excellent properties from various viewpoints.

According to the solid electrolyte capacitor of the embodiment 2, the high-molecular weight compound contains bonding which exhibits hydrogen bonding in a main chain, and the resin contains 2 wt % or more of moisture. Accordingly, it is possible to provide a composite sheet having a high moisture retaining ability and an excellent oxide film repairing function.

According to the solid electrolyte capacitor of the embodiment 2, the bonding which exhibits hydrogen bonding is ether bonding. Accordingly, polarity of a high-molecular weight compound is increased and hence, a high-molecular weight compound and water can easily generate hydrogen bonding. As a result, it is possible to provide a composite sheet having a higher moisture retaining ability.

The solid electrolyte capacitor of the embodiment 2 has substantially the same configuration as the solid electrolyte capacitor 1 of the embodiment 1 with respect to points other than a kind of high-molecular weight compound (kind of resin) and hence, the solid electrolyte capacitor of the embodiment 2 has advantageous effects acquired by the corresponding configurations of the solid electrolyte capacitor of the embodiment 2 among advantageous effects acquired by the solid electrolyte capacitor 1 of the embodiment 1.

Embodiment 3

Figure 4:
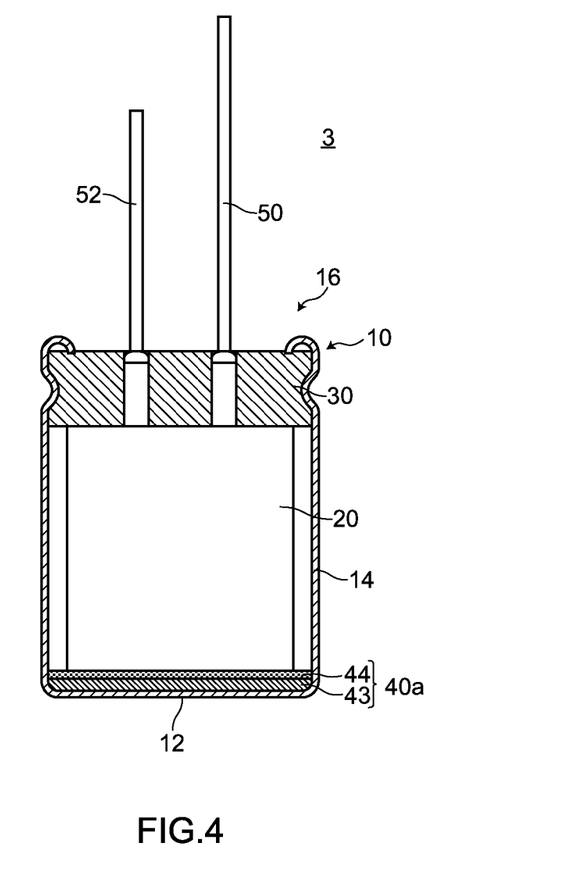
FIG. 4 is a view for explaining a solid electrolyte capacitor of an embodiment 3.

FIG. 4 is a view for explaining a solid electrolyte capacitor 3 of an embodiment 3.

The solid electrolyte capacitor 3 of the embodiment 3 basically has substantially the same configuration as the solid electrolyte capacitor 1 of the embodiment 1. However, the solid electrolyte capacitor 3 of the embodiment 3 differs from the solid electrolyte capacitor 1 of the embodiment 1 in the configuration of a composite sheet. That is, in the solid electrolyte capacitor 3 of the embodiment 3, as shown in FIG. 4, the composite sheet 40a includes a resin containing sheet 43 (same as the composite sheet 40 in the embodiment 1) and a resin layer 44.

The resin layer 44 is formed on a surface of the resin containing sheet 43 on a capacitor element 20 side, and the composite sheet 40a is adhered to the capacitor element 20 with the resin layer 44 interposed therebetween.

In the embodiment 3, in the resin solution filling step S22, a larger amount of resin solution is filled in the housing 10 compared to the embodiment 1 so that the resin layer 44 can be formed on the resin containing sheet 43 (composite sheet 40 in the embodiment 1).

As described above, the solid electrolyte capacitor 3 of the embodiment 3 differs from the solid electrolyte capacitor 1 of the embodiment 1 in the configuration of the composite sheet. On the other hand, the composite sheet 40a having the structure where a resin 42 made of a high-molecular weight compound is retained in a fiber sheet 41 is disposed. Accordingly, in the same manner as the solid electrolyte capacitor 1 of the embodiment 1, the solid electrolyte capacitor of the embodiment 3 also provides a solid electrolyte capacitor having a high withstand voltage in the same manner as conventional electrolyte capacitors and having excellent properties from various viewpoints.

According to the solid electrolyte capacitor 3 of the embodiment 3, the resin layer 44 is formed on the surface of the resin containing sheet 43 on a capacitor element 20 side. Accordingly, the surface (the surface on a capacitor element 20 side) of the fiber sheet 41 in the resin containing sheet 43 is closed by a resin whereby an electric discharge through the inner space of the fiber sheet 41 can be surely eliminated.

The solid electrolyte capacitor 3 of the embodiment 3 has substantially the same configuration as the solid electrolyte capacitor 1 of the embodiment 1 with respect to points other than the configuration of the composite sheet and hence, the solid electrolyte capacitor 3 of the embodiment 3 has advantageous effects acquired by the corresponding configurations of the solid electrolyte capacitor 1 of the embodiment 1 among advantageous effects acquired by the solid electrolyte capacitor 1 of the embodiment 1.

Embodiment 4

Figure 5A:
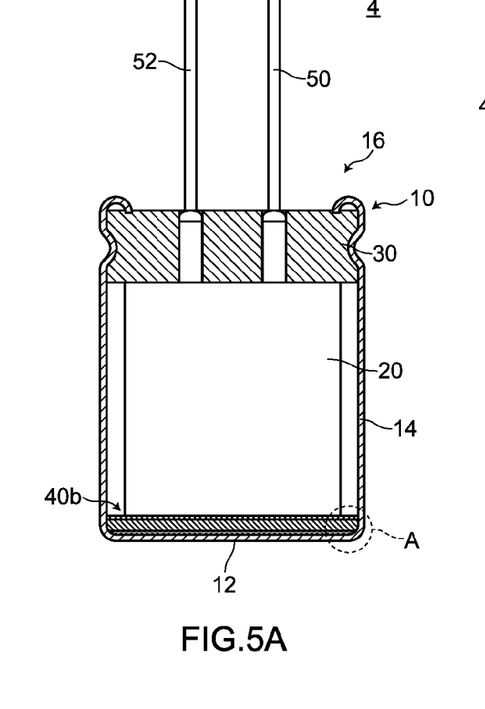
FIGS. 5A and 5B are views for explaining a solid electrolyte capacitor of an embodiment 4.
Figure 5B:
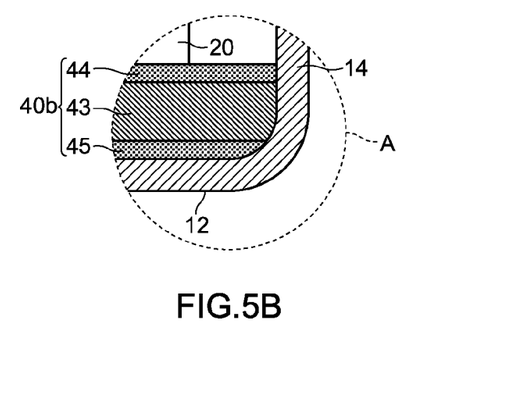

FIG. 5A and FIG. 5B are views for explaining a solid electrolyte capacitor 4 of an embodiment 4. FIG. 5A is a cross-sectional view of the solid electrolyte capacitor 4, and FIG. 5B is an enlarged view of a portion in FIG. 5A surrounded by a broken line A.

The solid electrolyte capacitor 4 of the embodiment 4 basically has substantially the same configuration as the solid electrolyte capacitor 3 of the embodiment 3. However, the solid electrolyte capacitor 4 of the embodiment 4 differs from the solid electrolyte capacitor 3 of the embodiment 3 in the configuration of a composite sheet. That is, in the solid electrolyte capacitor 4 of the embodiment 4, as shown in FIG. 5, the composite sheet 40b includes a resin containing sheet 43 (the composite sheet 40 in the embodiment 1) and resin layers 44, 45.

The resin layer 45 is formed on a surface of the resin containing sheet 43 on a bottom surface portion 12 side, and the composite sheet 40b is adhered to the bottom surface portion 12 with the resin layer 45 interposed therebetween.

In the embodiment 4, in a resin solution filling step S22, a larger amount of resin solution is filled in a housing 10 compared to the embodiment 1. In an impregnating step S23, not only that the resin solution is impregnated into an inner space of a fiber sheet 41 but also that the resin solution is impregnated such that the resin solution reaches (or is wound around to reach) a lower side (a bottom surface portion side) of the fiber sheet 41. Accordingly, the resin layers 44, 45 can be formed on both surfaces of the resin containing sheet 43 (same as the composite sheet 40 in the embodiment 1).

As described above, the solid electrolyte capacitor 4 of the embodiment 4 differs from the solid electrolyte capacitor 3 of the embodiment 3 in the configuration of the composite sheet. On the other hand, the composite sheet 40b having the structure where a resin 42 made of a high-molecular weight compound is retained in a fiber sheet 41 is disposed in the solid electrolyte capacitor 4 of the embodiment 4. Accordingly, in the same manner as the solid electrolyte capacitor 3 of the embodiment 3, the solid electrolyte capacitor 4 of the embodiment 4 also provides a solid electrolyte capacitor having a high withstand voltage in the same manner as conventional electrolyte capacitors and having excellent properties from various viewpoints.

According to the solid electrolyte capacitor 4 of the embodiment 4, the resin layers 44, 45 are formed on both surfaces of the resin containing sheet 43 (the composite sheet 40 in the embodiment 1). Accordingly, a surface of the fiber sheet 41 on a capacitor element 20 side and a surface of the fiber sheet 41 on a bottom surface portion 12 side are closed by a resin whereby an electric discharge through the inner space of the fiber sheet 41 can be surely eliminated.

The solid electrolyte capacitor 4 of the embodiment 4 has substantially the same configuration as the solid electrolyte capacitor 3 of the embodiment 3 with respect to points other than the configuration of the composite sheet and hence, the solid electrolyte capacitor 4 of the embodiment 4 has advantageous effects acquired by the corresponding configurations of the solid electrolyte capacitor 3 of the embodiment 3 among advantageous effects acquired by the solid electrolyte capacitor 3 of the embodiment 3.

TEST EXAMPLES

Figure 6A:
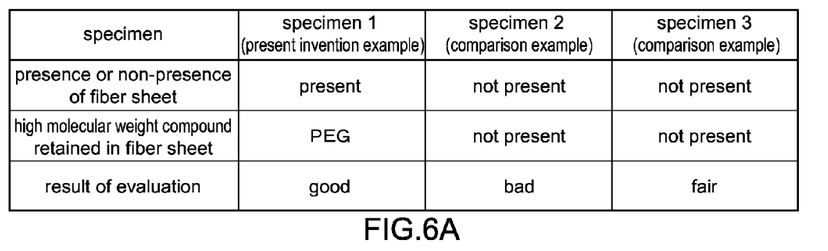
FIGS. 6A to 6C are tables showing data on respective specimens used in test examples and evaluation results of the test examples.
Figure 6B:
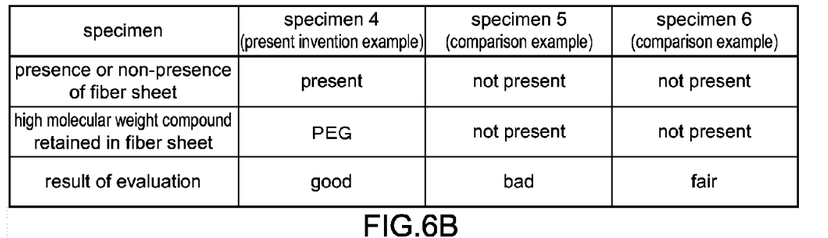
Figure 6C:
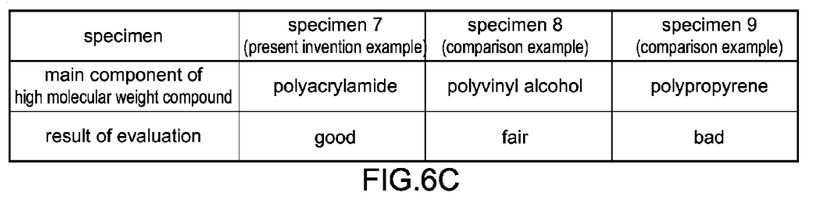

FIG. 6A to 6C are tables showing data on respective specimens used in test examples and evaluation results of the test examples. FIG. 6A is the table showing data on the respective specimens used in the test example 1 and the evaluation results, FIG. 6B is the table showing data on the respective specimens used in the test example 2 and the evaluation results, and FIG. 6C is the table showing data on the respective specimens used in the test example 3 and the evaluation results.

The test examples 1 to 3 are test examples for ascertaining that the solid electrolyte capacitor according to the present invention is a solid electrolyte capacitor having a high withstand voltage and excellent properties from various viewpoints.

Test Example 1

The test example 1 is the test example for ascertaining that the solid electrolyte capacitor according to the present invention is a solid electrolyte capacitor having a higher withstand voltage than the solid electrolyte capacitors of the respective comparison examples.

1. Preparation of Specimens

A solid electrolyte capacitor similar to the solid electrolyte capacitor 1 of the embodiment 1 is prepared and the solid electrolyte capacitor is used as a specimen 1 (present invention example). In the specimen 1, a density of a fiber sheet is set to 0.50 g/cm$^3$. A solid electrolyte capacitor having the similar configuration to the specimen 1 except for that the solid electrolyte capacitor is not provided with a composite sheet is prepared and the solid electrolyte capacitor is used as a specimen 2 (comparison example). A solid electrolyte capacitor having similar configuration as the specimen 1 except for that the solid electrolyte capacitor is provided with only a fiber sheet in place of a composite sheet is prepared and the solid electrolyte capacitor is used as a specimen 3 (comparison example).

2. Evaluation Method

Evaluation is carried out by measuring an electric current which flows between an anode terminal and a cathode terminal while changing a voltage applied between the anode terminal and the cathode terminal. In the case where a voltage generated at the time of occurrence of sudden increase of the electric current is below 100V as the result of the test, it is determined that a withstand voltage is low, and evaluation "bad" is given to the specimen. In the case where a voltage generated at the time of occurrence of sudden increase of the electric current is 100V or above and below 120V as the result of the test, it is determined that a withstand voltage is high to some extent, and evaluation "fair" is given to the specimen. In the case where a voltage generated at the time of occurrence of sudden increase of the electric current is 120V or above as the result of the test, it is determined that a withstand voltage is high, and evaluation "good" is given to the specimen.

3. Evaluation Result

Figure 7:
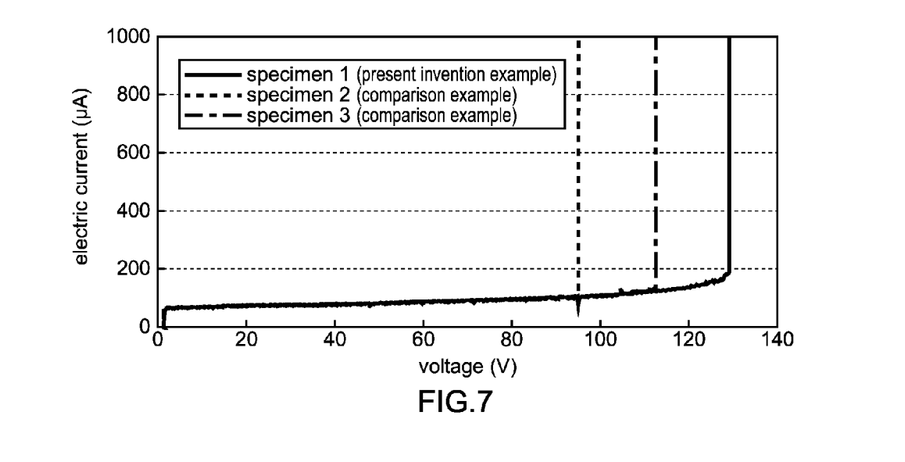
FIG. 7 is a graph showing the result of a test example 1.

FIG. 7 is a graph showing the result of the test example 1.

As can be also understood from FIG. 7, in the specimen 1 (present invention example), a voltage generated at the time of occurrence of sudden increase of the electric current flowing between the anode terminal and the cathode terminal is 129V. Since the voltage generated at the time of occurrence of sudden increase of the electric current is 120V or above, evaluation "good" is given to the specimen 1 (see FIG. 6A).

In the specimen 2 (comparison example), a voltage generated at the time of occurrence of sudden increase of the electric current flowing between the anode terminal and the cathode terminal is 95V. Since the voltage is below 100V, evaluation "bad" is given to the specimen 2 (see FIG. 6A).

In the specimen 3 (comparison example), a voltage generated at the time of occurrence of sudden increase of the electric current flowing between the anode terminal and the cathode terminal is 112V. Since the voltage is 100V or above and below 120V, evaluation "fair" is given to the specimen 3 (see FIG. 6A).

Accordingly, it is ascertained that the solid electrolyte capacitor according to the present invention is a solid electrolyte capacitor having a higher withstand voltage than the solid electrolyte capacitors of the comparison examples.

Test Example 2

The test example 2 is a test example for ascertaining that the solid electrolyte capacitor according to the present invention is a solid electrolyte capacitor having a longer lifetime property than the solid electrolyte capacitors of the respective comparison examples.

1. Preparation of Specimens

A solid electrolyte capacitor similar to the solid electrolyte capacitor of the specimen 1 is prepared and the solid electrolyte capacitor is used as a specimen 4 (present invention example). Further, solid electrolyte capacitors similar to the specimen 2 and the specimen 3 in test example 1 are prepared and these solid electrolyte capacitors are used as specimen 5 (comparison example) and a specimen 6 (comparison example) respectively.

2. Evaluation Method

After the respective specimens (specimens 4 to 6) are placed stationarily in the inside of a thermostatic bath at a temperature of 125° C., a leakage current is measured in a state where a prescribed DC voltage is applied to the respective specimens. The measurement of a leakage current is performed for every 250 hours using Digital Multimeter 73401 made by Yokogawa Meters and Instruments Corporation. As a result, when a leakage current after 5000 hours have elapsed from the start of the measurement is 5 times as large as an initial value (approximately 5 µA) or less, evaluation "good" is given to the specimen, and when a leakage current is more than 5 times as large as an initial value (approximately 5 µA) before 5000 hours have elapsed from the start of the measurement, evaluation "bad" is given to the specimen.

Figure 8:
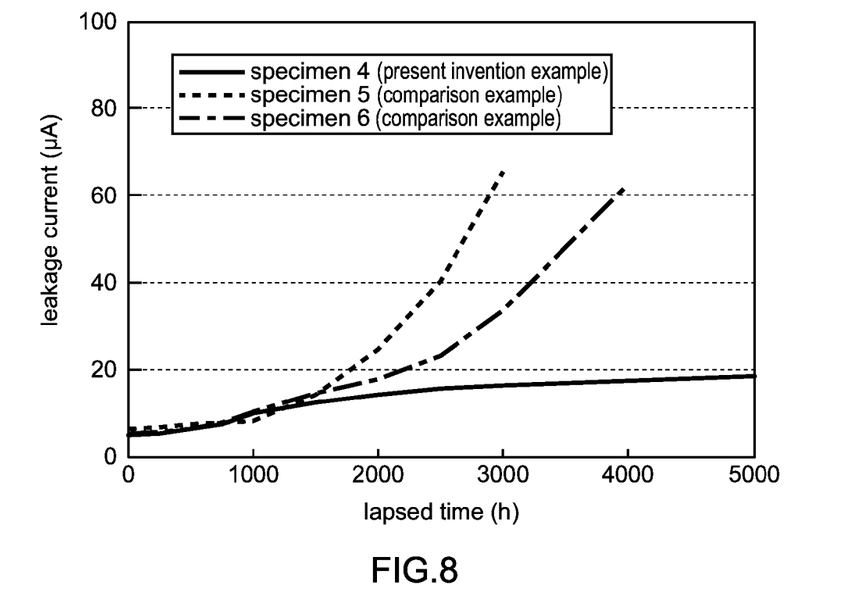
FIG. 8 is a graph showing the result of a test example 2.

FIG. 8 shows the result of the test example 2.

As can be understood also from FIG. 8, in the specimen 4 (present invention example), a leakage current does not suddenly increase until 5000 hours have elapsed from the start of the measurement, and an amount of leakage current after 5000 hours have elapsed from the start of the measurement is less than 5 times as large as an initial value and hence, evaluation "good" is given to the specimen 4 (see FIG. 6B).

In the specimen 5 (comparison example), a leakage current suddenly starts to increase after 1500 hours have elapsed from the start of the measurement, and an amount of leakage current reaches 65 µA after 3000 hours have elapsed from the start of the measurement, and the leakage current further continues to increase. Accordingly, it is considered that a leakage current after 5000 hours have elapsed from the start of the measurement is 5 times or more as large as the initial value and hence, evaluation "bad" is given to the specimen 5 (see FIG. 6B).

In the specimen 6 (comparison example), a leakage current suddenly starts to increase after 1000 hours have elapsed from the start of the measurement, and an amount of leakage current reaches 60 µA after 4000 hours have elapsed from the start of the measurement, and the leakage current further continues to increase. Accordingly, it is considered that a leakage current after 5000 hours have elapsed from the start of the measurement is 5 times or more as large as the initial value and hence, evaluation "bad" is given to the specimen 6 (see FIG. 6B).

Accordingly, it is ascertained that the solid electrolyte capacitor according to the present invention is a solid electrolyte capacitor having a longer lifetime than the solid electrolyte capacitors of the comparison examples.

Text Example 3

The test example 3 is a test example for ascertaining that a resin having an oxide film repairing property in the embodiment 1 can retain a larger amount of moisture than resins used in respective comparison examples.

1. Preparation of Specimens (1) Specimen 7 (Present Invention Example)

100 g of aqueous solution is prepared by dissolving 5 g of polyacrylamide and 2.5 g of ethylene glycol used in the embodiment 1 into water. Thereafter, out of 100 g of aqueous solution, 20 g of the aqueous solution is filled into a petri dish, and a film-like specimen is prepared by drying the filled aqueous solution until no weight change occurs in the film-like specimen. This film-like specimen is used as a specimen 7 (present invention example). Ethylene glycol is added to the specimen 7 so as to enhance dispersibility of the specimen 7. Ethylene glycol is added also to specimens 8 and 9 described hereinafter in the same manner.

(2) Specimen 8 (Comparison Example)

100 g of aqueous solution is prepared by dissolving 5 g of polyvinyl alcohol and 2.5 g of ethylene glycol into water. Thereafter, out of 100 g of aqueous solution, 20 g of aqueous solution is filled into a petri dish, and a film-like specimen is prepared by drying the filled aqueous solution until no weight change occurs in the film-like specimen. This film-like specimen is used as a specimen 8 (comparison example).

(3) Specimen 9 (Comparison Example)

1 g of polypropylene in a film shape is placed on a petri dish, and a film-like specimen is prepared by drying the polypropylene until no weight change occurs in the film-like specimen. This film-like specimen is used as a specimen 9 (comparison example).

2. Evaluation Method

Evaluation is carried out by measuring a change in weight after the petri dishes in which the respective specimens are placed are left in the inside of a room (temperature 24° C., humidity 30%, RH atmosphere). When a change in weight from immediately after the start of the measurement to a point of time where 30 hours have elapsed from the start of the measurement (a point of time where no change in weight occurs in all specimens) is 0.05 g or more, it is determined that the specimen can retain a large amount of moisture, and evaluation "good" is given to the specimen. When a change in weight from immediately after the start of the measurement to a point of time where 30 hours have elapsed from the start of the measurement is 0.01 g or more and less than 0.05 g, it is determined that the specimen can retain moisture to some extent, and evaluation "fair" is given to the specimen. When a change in weight from immediately after the start of the measurement to a point of time where 30 hours have elapsed from the start of the measurement is less than 0.01 g, it is determined that the specimen minimally retains moisture, and evaluation "bad" is given to the specimen.

3. Result of Evaluation

Figure 9:
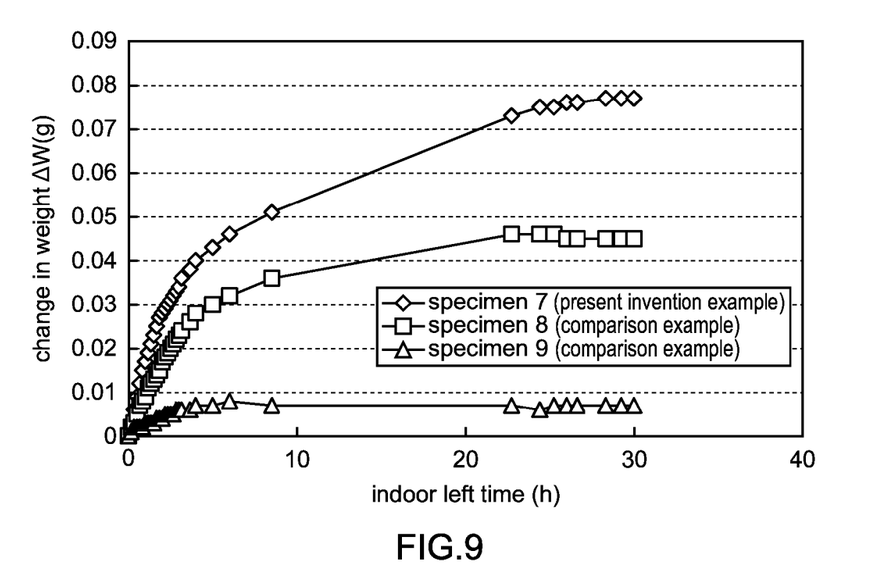
FIG. 9 is a graph showing the result of a test example 3.

FIG. 9 is a view showing the result of the test example 3.

As can be understood also from FIG. 9, in the specimen 7 (present invention example), the above-mentioned change in weight is 0.077 g and hence, the evaluation "good" is given to the specimen 7 (see FIG. 6C).

In the specimen 8 (comparison example), the above-mentioned change in weight is 0.045 g and hence, the evaluation "fair" is given to the specimen 8 (see FIG. 6C).

In the specimen 9 (comparison example), the above-mentioned change in weight is 0.007 g and hence, the evaluation "bad" is given to the specimen 9 (see FIG. 6C).

From the result of evaluation, it is ascertained that the resin of the embodiment 1 having oxide film repairing property can retain a larger amount of moisture than the resins of the respective comparison examples.

Although the present invention has been described based on the above-mentioned embodiments, the present invention is not limited to the above-mentioned embodiments. The present invention can be carried out in various modes without departing from the gist of the present invention, and the following modifications are also conceivable.

(1) Polyacrylamide is used as a high-molecular weight compound in the above-mentioned embodiment 1, and hydroxyethyl cellulose is used as a high-molecular weight compound in the above-mentioned embodiment 2. However, the present invention is not limited to such high-molecular weight compound. Resins made of high-molecular weight compounds other than these high-molecular weight compounds may be also used in the present invention.

(2) In the above-mentioned respective embodiments, a resin solution is filled into the inside of the housing 10 after the fiber sheet 41 is arranged in the inside of the housing 10. However, the present invention is not limited to such a case. For example, the fiber sheet 41 may be arranged in the inside of the housing 10 after a resin solution is filled into the inside of the housing 10.

(3) In the above-mentioned embodiment 3, the composite sheet 40a has the resin layer 44 on the surface of the resin containing sheet 43 on a capacitor element 20 side. However, the present invention is not limited to such a case. For example, the composite sheet may have a resin layer on a surface of the resin containing sheet 43 on a bottom surface portion 12 side. In this case, the adhesiveness between the resin containing sheet 43 and the bottom surface portion 12 is increased so that the present invention acquires an advantageous effect that the adhesiveness between the composite sheet and the housing is increased.

What is claimed is:

1. A solid electrolyte capacitor comprising:
a bottomed cylindrical housing which includes a bottom surface portion and a side surface portion raised from the bottom surface portion, and has an opening portion formed on an edge portion of the side surface portion;
a capacitor element which is accommodated in the inside of the housing, and is formed by winding an anode foil and a cathode foil in an overlapping state with a separator interposed therebetween and by filling a space formed between the anode foil and the cathode foil with a solid electrolyte;
a sealing member which seals the opening portion of the housing in a state where the capacitor element is accommodated in the inside of the housing; and
a composite sheet which is arranged between the bottom surface portion of the housing and the capacitor element, and has the structure where a resin made of a high-molecular weight compound is retained in a fiber sheet containing at least cellulose fibers, wherein
the resin is a hydrophilic resin, the resin is configured such that when a defect occurs in an oxide film on the edge surface of the anode foil or the cathode foil the defect is repaired by supplying moisture contained in the resin to the defect, and the resin contains moisture of a range of 2 wt % to 40 wt %.

2. The solid electrolyte capacitor according to claim 1, wherein the high-molecular weight compound contains a hydrophilic functional group in a side chain thereof.

3. The solid electrolyte capacitor according to claim 1, wherein the high-molecular weight compound contains bonding which exhibits hydrogen bonding in a main chain.

4. The solid electrolyte capacitor according to claim 1, wherein the resin has adhesiveness, and the composite sheet is adhered to the bottom surface portion of the housing by means of the resin.

5. The solid electrolyte capacitor according to claim 1, wherein the resin is an insulating resin.

6. The solid electrolyte capacitor according to claim 1, wherein the resin has a heat insulating property.

7. The solid electrolyte capacitor according to claim 1, wherein the density of the fiber sheet falls within a range of 0.2 g/cm$^3$ to 1.4 g/cm$^3$.

8. The solid electrolyte capacitor according to claim 1, wherein a thickness of the composite sheet is set to a value which falls within a range of 1 μm to 200 μm.

* * * * *